(No Model.)
A. K. GIBSON.
FLOUR BIN AND SIFTER.
No. 504,342. Patented Sept. 5, 1893.
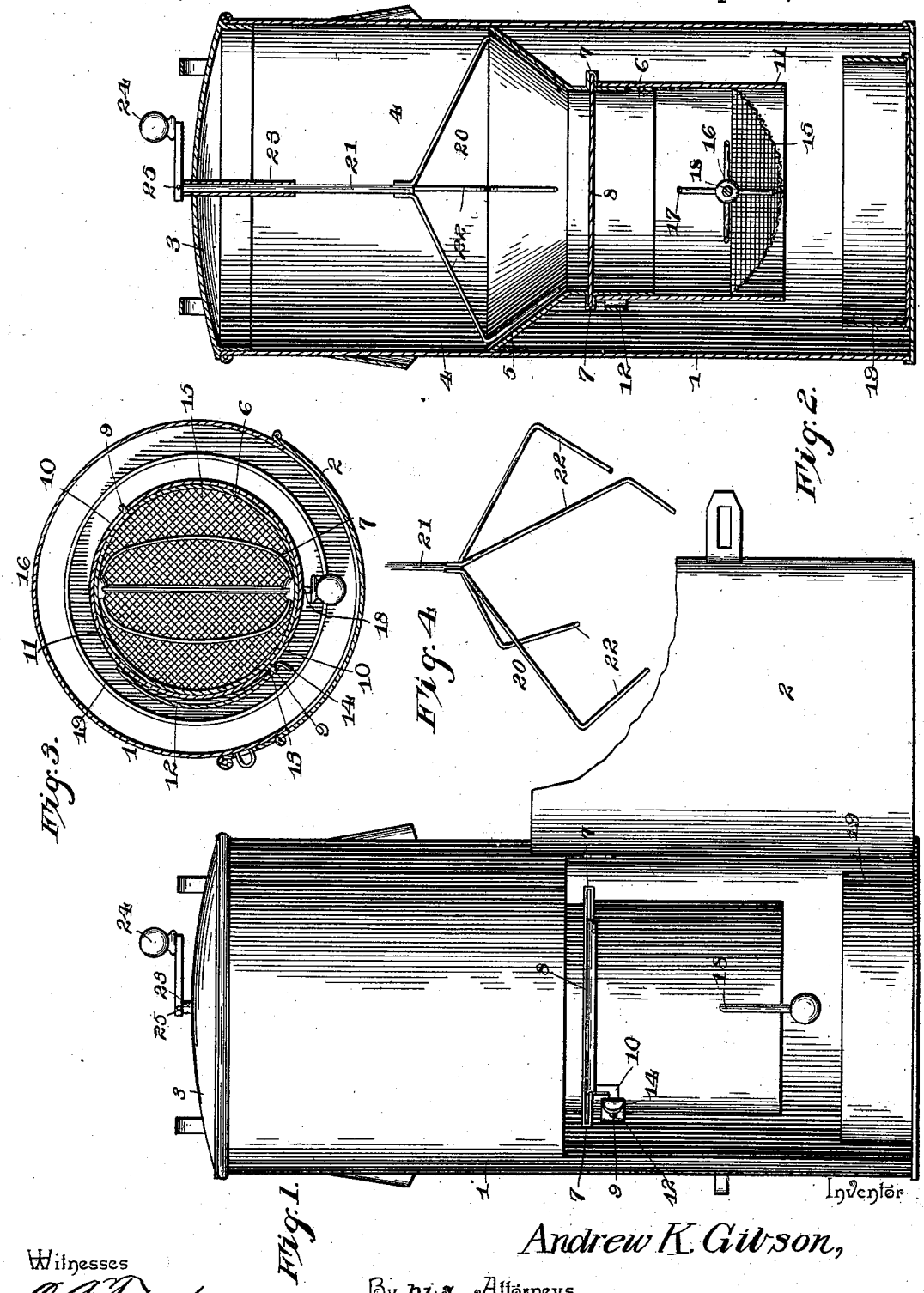
Witnesses
C. A. Ford.
N. J. Riley
Inventor
Andrew K. Gibson,
By his Attorneys,
C. A. Snow & Co.

UNITED STATES PATENT OFFICE.

ANDREW K. GIBSON, OF COSHOCTON, OHIO, ASSIGNOR TO THEODORE AGNEW, OF SAME PLACE.

FLOUR BIN AND SIFTER.

SPECIFICATION forming part of Letters Patent No. 504,342, dated September 5, 1893.

Application filed May 16, 1893. Serial No. 474,399. (No model.)

*To all whom it may concern:*

Be it known that I, ANDREW K. GIBSON, a citizen of the United States, residing at Coshocton, in the county of Coshocton and State of Ohio, have invented a new and useful Flour Bin and Sifter, of which the following is a specification.

The invention relates to improvements in flour bins and sifters.

The object of the present invention is to improve the construction of flour bins and sifters and to provide a simple and inexpensive one in which the flour will be prevented from lumping or caking in the bin, and which will enable flour to be sifted either within the casing or over a vessel in which the flour is designed to be used.

The invention consists in the construction and novel combination and arrangement of parts hereinafter fully described, illustrated in the accompanying drawings, and pointed out in the claims hereto appended.

In the drawings: Figure 1 is an elevation of a combined flour bin and sifter constructed in accordance with this invention, the door being open. Fig. 2 is a vertical sectional view, taken transversely of the casing. Fig. 3 is a horizontal sectional view. Fig. 4 is a detail perspective view of the vertically disposed agitator.

Similar numerals of reference indicate corresponding parts in all the figures of the drawings.

1 designates a cylindrical casing, having a hinged door 2 at its lower portion and provided with a removable cover 3; the upper portion of the casing forms a bin 4, having a tapering lower portion 5; and the latter is formed by a conical ring or band secured within the casing. The conical band has attached to it a depending cylindrical ring 6, forming a discharge-opening for the bin and provided between its ends with extended horizontal ways 7 in which is arranged a cut-off slide 8, for closing the mouth or contracted lower end of the bin. The cylindrical band 6 is provided at diametrically opposite points with horizontal projections 9, adapted to engage bayonet slots 10, of a sifter 11, which is detachably secured to the lower portion of the bin and adapted to be removed therefrom when it is desired to sift a quantity of flour into a dish or other vessel instead of sifting the same within the casing. When the sifter is detached the flour is prevented from escaping from the bin by the cut-off slide. The sifter is secured against accidental detachment from the bin by a curved spring 12, secured at one end to the outer face of the sifter and disposed horizontally thereon and terminating at its other end adjacent to the outer extremity of the horizontal branch of one of the bayonet slots and provided thereat with a perforation 13 to engage the adjacent projection to prevent the sifter from turning. The free end of the spring is extended and bent outward to form a thumb-piece 14 to enable the spring to be readily disengaged from the projection. The sifter is provided with a gauze or foraminous bottom 15, and has journaled within it a horizontally-disposed agitator 16. The agitator consists of bowed sides or wings 17, secured at their ends to a shaft 18, which terminates in a crank-handle. The crank-handle is located on the exterior of the sifter and has a swiveled handle portion.

A pan 19 is arranged on the bottom of the casing and is adapted to receive sifted flour when the sifting is performed within the casing. The slide is removed when the sifting is performed in this manner, and any quantity of flour may be readily sifted.

In order to prevent the flour within the bin from caking or lumping, a vertically disposed rotary agitator 20, is provided. The rotary agitator consists of a vertical stem 21, and angle-arms 22, having outwardly-inclined upper portions and inwardly-inclined lower portions, the latter being provided to shape the agitator to the configuration of the lower tapered portion of the flour bin. The stem of the vertically-disposed agitator is removably arranged in a depending tubular socket 23, secured to the center of the cover and projecting slightly above the same. A crank-handle 24 is detachably secured by a screw or pin 25 to the upper end of the stem, and is adapted to be removed to permit the cover to be taken off of the bin without removing the agitator when it is desired to supply the bin with flour. This construction is exceedingly advantageous, as the agitator does not have to be removed every time the cover is taken off and does not require or necessitate it being forced through the contents of the bin whenever the cover is placed thereon, thereby greatly increasing the durability of the agitator. The casing is provided at its sides with handles.

It will be readily seen that the combined bin and sifter is exceedingly simple and inexpensive in construction, and enables flour to be conveniently sifted and handled and that it prevents the flour lumping or caking within the agitator.

Changes in the form, proportion, and the minor details of construction may be resorted to without departing from the principle or sacrificing any of the advantages of this invention.

What I claim is—

1. The combination of a casing provided with a bin having a contracted lower end provided with opposite projections, a sifter fitting the lower end of the bin and provided with opposite bayonet slots to engage the said projections, and a curved spring secured to the sifter adjacent to one of the slots and having its free end terminating at the slot and provided with an opening to engage the adjacent projection and bent outward to form a thumbpiece, substantially as described.

2. The combination of a casing provided at its top with a bin, a cover, and a vertically-disposed rotary agitator journaled on the cover and having depending arms conforming to the configuration of the bin, substantially as described.

3. The combination of a casing provided at its top with a bin having a tapering conical lower portion, a cover, and a vertically-disposed rotary agitator journaled on the cover and provided with radial arms having downwardly-inclined upper portions and inwardly-inclined lower portions, whereby the lower portion of the agitator conforms to the configuration of the bottom of the bin, substantially as described.

4. The combination of a casing provided at its upper portion with a bin having a tapering bottom, a cover provided with a socket, an agitator comprising a vertical stem removably arranged in the socket and radial arms having downwardly-inclined upper portions and inwardly-inclined lower portions conforming to the configuration of the bottom of the bin, and a handle detachably secured to the upper end of the stem, whereby the cover may be removed without removing the agitator, substantially as and for the purpose described.

In testimony that I claim the foregoing as my own I have hereto affixed my signature in the presence of two witnesses.

ANDREW K. GIBSON.

Witnesses:
J. H. SIGGERS,
E. G. SIGGERS.